Patented Apr. 24, 1951

2,550,141

UNITED STATES PATENT OFFICE 2,550,141

PROCESS FOR THE PREPARATION OF THIO ESTERS

Thomas F. Doumani and Joseph F. Cuneo, Los Angeles, Calif., assignors to Union Oil Company of California, Los Angeles, Calif., a corporation of California No Drawing. Application November 16, 1948, Serial No. 60,412

6 Claims. (Cl. 260—455)

This invention relates to the preparation of sulfur-containing carbonyl compounds, and in particular concerns the acylation of mercaptan compounds employing an organic carboxylic acid anhydride in the presence of a catalyst derived from concentrated sulfuric acid.

It is known that mercaptan compounds may be reacted with acetic anhydride in the presence of sodium acetate or sodium hydroxide to form thioacetic acid esters. While the reaction is readily carried out at ordinary temperatures to obtain the desired ester products in satisfactory yield, it suffers from the disadvantage that the appreciable quantities of sodium acetate or sodium hydroxide required are difficult and expensive to recover in a form suitable for re-use.

We have now found that esters of thio acids may advantageously be obtained by reacting mercaptans of the general formula RSH, in which R represents an alkyl, alkenyl, or aromatic hydrocarbon radical, with organic carboxylic acid anhydrides in the presence of a small amount of a catalyst obtained by reacting concentrated sulfuric acid with at least twice the number of mols of an organic carboxylic acid anhydride. The catalyst prepared in this manner is a true catalyst since only a small proportion compared to the mercaptan compound is required, and the catalyst is not substantially destroyed but may be employed repeatedly for additional reactions.

The structure of the catalyst of this invention is not definitely known. In the preferred method of preparation the catalyst is prepared by reacting the sulfuric acid and the organic acid anhydride for a sufficiently long time to cause the disappearance of the sulfate ion from the product as evidenced by the lack of a precipitate when the reaction product is contacted with an aqeous solution of barium chloride. It is indicated by Murray, Journal of the American Chemical Society, vol. 62, page 1230, that the product of the reaction is sulfoacetic acid in the case of acetic anhydride and that in this reaction an intermediate is formed, acetyl sulfuric acid, which is in itself unstable and will hydrolyze to form sulfuric acid and acetic acid, or isomerize to the more stable sulfoacetic acid. It is believed, however, that the product of the reaction is not exclusively sulfoacetic acid or possibly even predominantly sulfoacetic acid but is more probably acetyl sulfoacetic acid. It may also be a complex containing sulfoacetic acid and acetic anhydride, or it may be a mixture containing acetyl sulfoacetic acid, sulfoacetic acid, the sulfoacetic acid-acetic acid complex and possibly other materials such as sulfonyldiacetate, sulfonyldiacetic acid, disulfodehydroacetic acid, and/or like compounds. The catalyst may also be used before it has entirely reacted to the point at which it ceases to show sulfate ions when tested with barium chloride solution, that is, at a point at which some acetyl sulfuric acid or even sulfuric acid itself is present in the catalyst, since these materials are also active catalysts for the reaction.

As an example of the process of the invention, a catalyst-acetic anhydride mixture was prepared by mixing 9.95 ml. of 99.5% sulfuric acid (0.1 mol) with 113 ml. of acetic anhydride (1.2 mols) and allowing the mixture to stand overnight until there was no evidence of the presence of sulfuric ions on testing with barium chloride solution. This catalyst mixture was slowly added to 111 ml. of ethyl mercaptan (1.5 mols) keeping the reaction mixture cool by immersion of the vessel in an ice bath. The reaction mixture was then refluxed for about one hour, which resulted in the formation of a homogeneous solution. This solution was then cooled and washed successively with water and dilute sodium carbonate solution. The washings were extracted with commercial pentane and the pentane extract was added to the previously washed reaction product, thereby dissolving it. The thus diluted and purified reaction mixture was dried with anhydrous sodium sulfate and fractionally distilled. Four fractions were obtained in the distillation, the first being the pentane diluent, the second being unreacted ethyl mercaptan, the third being the ethyl thioacetate reaction product and the fourth being a small amount of residual material. The reaction which took place was apparently as follows:

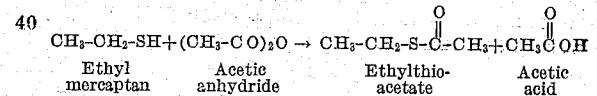

| Ethyl mercaptan | Acetic anhydride | Ethylthio-acetate | Acetic acid |

The ethyl thioacetate fraction amounted to about 72 ml. and the bulk of it boiled at about 116° to 117° C. which is the boiling point of the pure thio ester as reported in the literature.

By procedure similar to that above, other mercaptan compounds and other organic carboxylic acid anhydrides may be reacted in the presence of the catalyst herein disclosed to produce analogous thio acid esters. Thus, in place of ethyl mercaptan in the above process, we may employ other alkyl mercaptans such as methyl, propyl, butyl, amyl, hexyl, octyl, decyl, dodecyl, hexadecyl, and octadecyl mercaptans, etc.; alkenyl mercaptans such as vinyl, allyl, pentenyl, and octenyl mercaptans, etc.; and aromatic mercaptans such as phenyl, benzyl, xenyl, naphthyl, and tolyl mercaptans, etc. Mixtures of mercaptans, such as are obtained in certain petroleum refining operations, may likewise be employed.

In the above example acetic anhydride was employed as the acylation agent. It has been found, however, that other anhydrides may also be employed. These include propionic anhydride and other acyclic saturated carboxylic acid anhydrides having the general formula

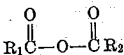

where $R_1$ and $R_2$ are alkyl groups such as methyl, ethyl, isopropyl, butyl and the like, and may be the same or different. $R_1$ and $R_2$ may also be cyclic groups such as cyclopentyl, cyclohexyl, or the corresponding groups present in naphthenic acid anhydrides.

Although the above are preferred, anhydrides of cyclic structure such as succinic anhydride and glutaric anhydride which are saturated, and have the general formula

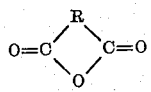

where R is an alkylene radical, may be employed. Phthalic anhydride and maleic anhydride and like anhydrides which are unsaturated or aromatic in character may also be employed.

It has also been found that in place of the above anhydride ketene and its homologs may be employed. The relationship between ketene and acetic anhydride becomes clear when it is pointed out that both are anhydrides of acetic acid. Thus by removal of 1 mol of water from 2 mols of acetic acid, acetic anhydride is formed; and by removal of 1 mol of water from 1 mol of acetic acid ketene is formed. It is also well known that acetic anhydride is formed by the reaction between acetic acid and ketene as indicated below:

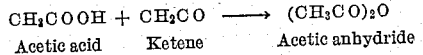

Acetic acid    Ketene    Acetic anhydride

It has been found that ketene may be employed in the place of acetic anhydride in all of the above reactions. In fact the ketene provides for a more economical process in that by its use no by-product acetic acid is formed. In the reaction between ethyl mercaptan and acetic anhydride for example, acetic acid is produced as a by-product according to the reaction shown, whereas when ketene is employed no by-product is produced, the main reaction apparently proceeding as follows:

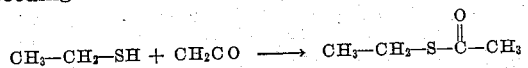

The latter reaction is preferably carried out in the presence of acetic anhydride. In this case the mechanism may be a combination of the acetic anhydride reaction previously shown with simultaneous conversions of the by-product acetic acid by means of the ketene to form additional acetic anhydride. Ketene homologs having the formula

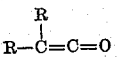

in which the R's are the same or different and may be hydrogen (ketene itself) or an alkyl group such as methyl, ethyl and the like, may be employed in place of the corresponding acid anhydride. For example, methyl ketene in which R is a methyl group may be considered the anhydride of propionic acid or propionic anhydride, and it has been found that methyl ketene can be employed in the above reactions in place of propionic anhydride. R may also be any other acyclic saturated hydrocarbon group as described above for the substituent groups on the mercaptans.

As indicated above, in the preparation of the catalyst it is preferred that the reaction between the organic acid anhydride and the sulfuric acid be continued until the product gives no test for sulfate ion, upon testing with barium chloride solution. As shown in the specific example this may be effected at room temperature over a period of several hours. At higher temperatures, e. g., 80° to 90° C., a much shorter time, e. g., ten minutes, is required. Temperatures between about 0° C. and 100° C. may be employed. The lower temperatures such as below about 40° C. are preferred on the basis of obtaining a product of light color. At high temperatures the catalyst is rather dark in color although its activity is still excellent. In this preparation it is possible to employ molal ratios of anhydride to sulfuric acid of about 2:1 or even as low as about 1:1 in some instances, but it is preferable to employ ratios greater than about 5:1. It is believed that the most active constituent of the catalyst is acetyl sulfoacetic acid which is prepared as indicated in the following reaction.

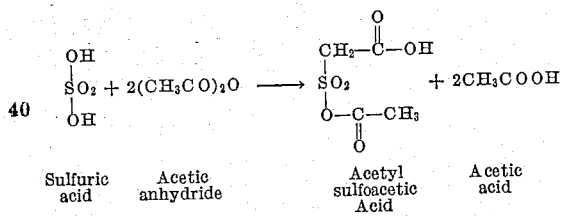

Sulfuric acid    Acetic anhydride    Acetyl sulfoacetic Acid    Acetic acid

As indicated in the above reaction acetic acid is produced as a by-product. In fact it has been observed that when a large excess of acetic anhydride is employed almost exactly two mols of acetic acid are produced for every mol of sulfuric acid reacted and about two mols of acetic anhydride are required for every mol of sulfuric acid. It is desirable to remove the by-product acetic acid prior to the use of the catalyst in the acylation reaction. This may be done in either of two ways. It may be distilled off under vacuum, or it may be reacted with ketene to produce additional acetic anhydride. The latter method is generally preferred since it does not require the use of elevated temperatures and the acetic anhydride produced is generally beneficial for the succeeding acylation reaction. The presence of excess acetic anhydride is also beneficial in that it maintains the reaction mixture in a single homogeneous phase and at the same time serves as all or part of the acylation agent for the reaction with the mercaptan.

The catalyst may also be prepared by other reactions. As indicated above it may be prepared by reacting sulfuric acid with ketene. This is preferably done in the presence of acetic anhydride or acetic acid as indicated above but may also be carried out directly. It may also be prepared by reacting sulfur trioxide with acetic acid or acetic anhydride, preferably the latter. The conditions for these reactions are approximately the same as for the reaction between the sulfuric acid and acetic anhydride as indicated above. Although in this discussion of the catalyst preparation, acetic anhydride, acetic acid and ketene only have been referred to, the same principles apply to the preparation of catalysts from other homologs of these anhydrides and acids such as propionic anhydride, methyl ketene and the other anhydrides referred to above for the acylation process. It is preferable to employ the same anhydride in the preparation of the catalyst as that employed in the acylation reaction in which it is to be used.

The temperatures employed in the acylation reaction may also be between about 0° C. and 100° C. The proportion of anhydride relative to the mercaptan compound may be varied over wide limits. Where the mercaptan is the more expensive commodity an excess of the anhydride should be employed in order to obtain greater yields based on the mercaptan compound. Where the anhydride is the more expensive commodity an excess of the mercaptan compound should be employed to improve the yield as based on the anhydride. The proportion of catalyst to be employed is preferably between about 0.1 and 0.2 mol of catalyst (calculated as acetyl sulfoacetic acid) per mol of anhydride employed, although proportions as low as 0.05 mol or less to 1.0 mol or more of catalyst per mol of anhydride may be employed. Under these conditions all of the mercaptan compounds described above may be reacted with the anhydrides described above to form thio acid esters by reactions analogous to that shown for the specific example above.

Where "concentrated sulfuric acid" is specified in the appended claims this may mean sulfuric acid of any concentration higher than about 50% by weight and including also fuming sulfuric acid of strength up to sulfuric anhydride itself. In general the acids preferred are between about 90% and 100% concentration since lower concentrations tend to convert excessive proportions of the anhydride to unreactive acid. Where "acylation agents" are specified herein, these include both the organic carboxylic acid anhydrides and ketenes.

Other modes of applying the principle of our invention may be employed instead of those explained, change being made as regards the procedures or materials employed, provided the step or steps stated by any of the following claims, or the equivalent of such stated step or steps, be employed.

This application is a continuation in part of our co-pending application, Serial No. 578,566, filed February 17, 1945, now Patent No. 2,522,752, dated Sept. 19, 1950.

We, therefore, particularly point out and distinctively claim as our invention:

1. A process for the preparation of a thio ester which comprises reacting a mercaptan compound having the general formula RSH, wherein R represents a radical selected from the class consisting of alkyl, alkenyl and aromatic hydrocarbon radicals, with an acylation agent of the class consisting of organic carboxylic acid anhydrides and ketenes in the presence of an acylation catalyst prepared by reacting concentrated sulfuric acid with more than double its molal quantity of an acylation agent of the class consisting of organic carboxylic acid anhydrides and ketenes at a temperature between about 0° C. and 100° C. for a time sufficient to cause the substantial disappearance of sulfate ion from the product.

2. A process according to claim 1 in which the acylation agent employed in the catalyst preparation is the same as the acylation agent employed in the reaction with the mercaptan compound.

3. A process according to claim 1 in which the acylation agent employed in the catalyst preparation is an organic carboxylic acid anhydride and the acylation agent employed in the reaction with the mercaptan compound is a ketene.

4. A process according to claim 1 in which the acylation agents are both acylic and saturated.

5. A process according to claim 1 in which the acylation agents are both acetic anhydride.

6. A process according to claim 1 in which the mercaptan compound is ethyl mercaptan and both acylation agents are acetic anhydride.

THOMAS F. DOUMANI.
JOSEPH F. CUNEO.

REFERENCES CITED

The following references are of record in the file of this patent:

UNITED STATES PATENTS

| Number | Name | Date |
|---|---|---|
| 2,212,895 | Allen | Aug. 27, 1940 |
| 2,445,142 | Himel | July 13, 1948 |

OTHER REFERENCES

Staudinger: "Die Ketene" (1912), page 34.
Fraenkel-Conrat: "Chemical Abstracts," vol. 38 (1944), col. 2051[9].